United States Patent [19]

Kawauchi et al.

[11] Patent Number: 4,950,210

[45] Date of Patent: Aug. 21, 1990

[54] TIMING BELT COVER DEVICE

[75] Inventors: Toshiyuki Kawauchi; Seiji Nanba, both of Hiroshima, Japan

[73] Assignee: Mazda Motor Corporation, Hiroshima, Japan

[21] Appl. No.: 414,287

[22] Filed: Sep. 29, 1989

[30] Foreign Application Priority Data

Oct. 4, 1988 [JP] Japan .......................... 63-130607[U]

[51] Int. Cl.[5] .............................................. F16H 57/02

[52] U.S. Cl. ...................................... 474/144; 74/608; 280/159

[58] Field of Search ................................ 474/144–147, 474/140; 74/608, 606 R; 180/84; 280/847, 159, 160

[56] References Cited

U.S. PATENT DOCUMENTS 4,723,619 2/1988 Yamamoto et al. ............ 474/144 X
4,793,457 12/1988 Siewert et al. .................. 474/144 X
4,869,708 9/1989 Hoffmann et al. ............. 474/144 X

FOREIGN PATENT DOCUMENTS 61-183444 11/1986 Japan .

*Primary Examiner*—Thuy M. Bui
*Attorney, Agent, or Firm*—Fleit, Jacobson, Cohn, Price, Holman & Stern

[57] ABSTRACT

An engine peripheral structure having a timing belt cover mounted on a cylinder block, an engine mount bracket fixed to the cylinder block through an opening formed in the belt cover, a water pump housing arranged adjacent to the bracket and integrally formed with annular rib. The annular rib is formed with an extended portion projected beyond surface of the belt cover through the opening. The extended portion of the annular rib of the pump housing is continued with outer surface portion of the bracket. The extended portion and the outer surface portion is extended along an edge portion of the opening of the belt cover. The bracket is formed with a circular rib facing to a remaining portion of the annular rib other than the extended portion. This structure improves a sealing property in a timing belt chamber defined by the belt cover, bracket, pump housing and the cylinder block.

17 Claims, 3 Drawing Sheets

TIMING BELT COVER DEVICE

BACKGROUND OF THE INVENTION

1. Field of the Invention

The present invention relates to an engine peripheral structure, more specifically to a timing belt cover for an engine.

2. Description of the Prior Art

There has been well known that an engine is provided at one side with a timing belt which connects a crank shaft with a cam shaft for driving intake and exhaust valves at a predetermined timing. The timing belt is normally covered by a belt cover so that the timing belt is protected from being exposed to a dust or water.

There have been also known an engine mounting structure in which an engine mount bracket is arranged at a central portion of a side portion of the engine as typically known in so-called FF (front engine front drive) type vehicle. With this structure, the engine mount bracket is extended through the belt cover member for connecting a main body of the engine with vehicle body. It will be understood that there will deteriorate a seal property of a timing belt chamber defined by the belt cover due to an opening formed therein for the engine mount bracket.

Moreover, in an engine provided with a water pump at the front side portion wherein a drive shaft of the water pump projects from the belt cover member, there occurs a similar problem.

In view of the above, Japanese Utility model Public Disclosure No. 61-183444, laid open to the public on Nov. 15, 1986, discloses an engine peripheral structure in which a seal rubber is disposed between an opening of a belt cover member and an engine mount bracket extending through the opening and a shaft member of a water member is also disposed within the belt cover member to be driven by the timing belt.

It should however be noted that the structure disclosed in the Japanese publication limits a free design with regard to optimum arrangement of devices attached to the engine including the water pump and the engine mount bracket.

SUMMARY OF THE INVENTION

It is therefore an object of the invention to provide a belt cover of a timing belt having an improved seal property against a foreign substance in an engine provided with engine bracket and water pump in the vicinity of the belt cover so that a timing belt can be kept clean.

It is another object of the invention to provide a compact timing belt cover device.

It is further object of the invention to provide an engine peripheral structure which allows an engine mount bracket member and a water pump casing to be arranged at the optimum position.

According to the present invention, the above objects and other objects can be accomplished by an engine peripheral structure comprising an engine body member, a belt cover device mounted on the engine body member for covering a timing belt of the engine, an engine mount bracket mounted on the engine body member through an opening formed in the belt cover device, a water pump housing arranged adjacent to the engine mount bracket and integrally formed with annular rib around a journal portion for a water pump shaft, the annular rib being formed with an extended portion of a substantially semi-cylindrical configuration projected beyond surface of the belt cover device through the opening of the belt cover device, the extended portion of the annular rib of the pump housing being continued with outer surface portion of the engine mount bracket, the extended portion and the outer surface portion being extended along an edge portion of the opening of the belt cover device, the engine mount bracket being formed with a circular rib extended inner side of a remaining portion of the annular rib other than the extended portion in an overlapped relationship with the remaining portion.

The annular rib is formed with a stepped portion of upper end of the extend portion. The belt cover device can be constituted by a pair of covers formed with cut out portions. The extended portion faces to cut out portion of the belt cover device defining an opening thereof.

A seal rubber may intervence for sealing between outer surface of the extended portion and edge portion of the cut out portions. The engine mount bracket is provided with a circular rib at a lower end thereof extending toward the cylinder block. The upper portion of the annular rib is extended upwardly beyond the lower end of the bracket in a space between inner surface of the bracket and outer surface of the cylinder block so that an overlapped portion is formed by the lower end portion of the bracket and the upper end portion of the pump housing.

The upper portion of the annular rib extends outwardly and the circular rib of the bracket extends inwardly at a lower position of the upper portion of the annular rib in parallel therewith in an overlapped relationship with each other. A seal member can be disposed between the upper portion of the annular rib and the circular rib for sealing. The seal member may be omitted.

According to the above structure, both the engine mount bracket and the pump housing can be arranged at an optimum position through the opening formed in the belt cover member with a desired dimension. Thus, there occurs no interference between the belt cover member and the bracket and the pump housing. The outer surface of the peripheral portion of the engine mount bracket and the extended portion of the pump housing is extended along the edge portion of the opening of the belt cover member and the extended portion of the pump housing and the peripheral portion of the engine mount bracket and the engine mount is provided with the circular rib combined with the remaining portion of the annular rib of the pump housing so as to provide a timing belt chamber with an improved seal property.

In this structure, both the engine bracket and the water pump housing can be arranged within a single opening formed in the belt cover member. This facilitates to simplify the seal structure for the timing belt chamber and make the entire arrangement compact. The annular rib of the pump housing increases the rigidity of the pump housing so that the seal property pump housing can be improved.

The above and other objects and features of the present invention will be apparent from the following description by taking reference with accompanying drawings employed for a preferred embodiment of the present invention.

DESCRIPTION OF PREFERRED EMBODIMENTS

Figure 1:
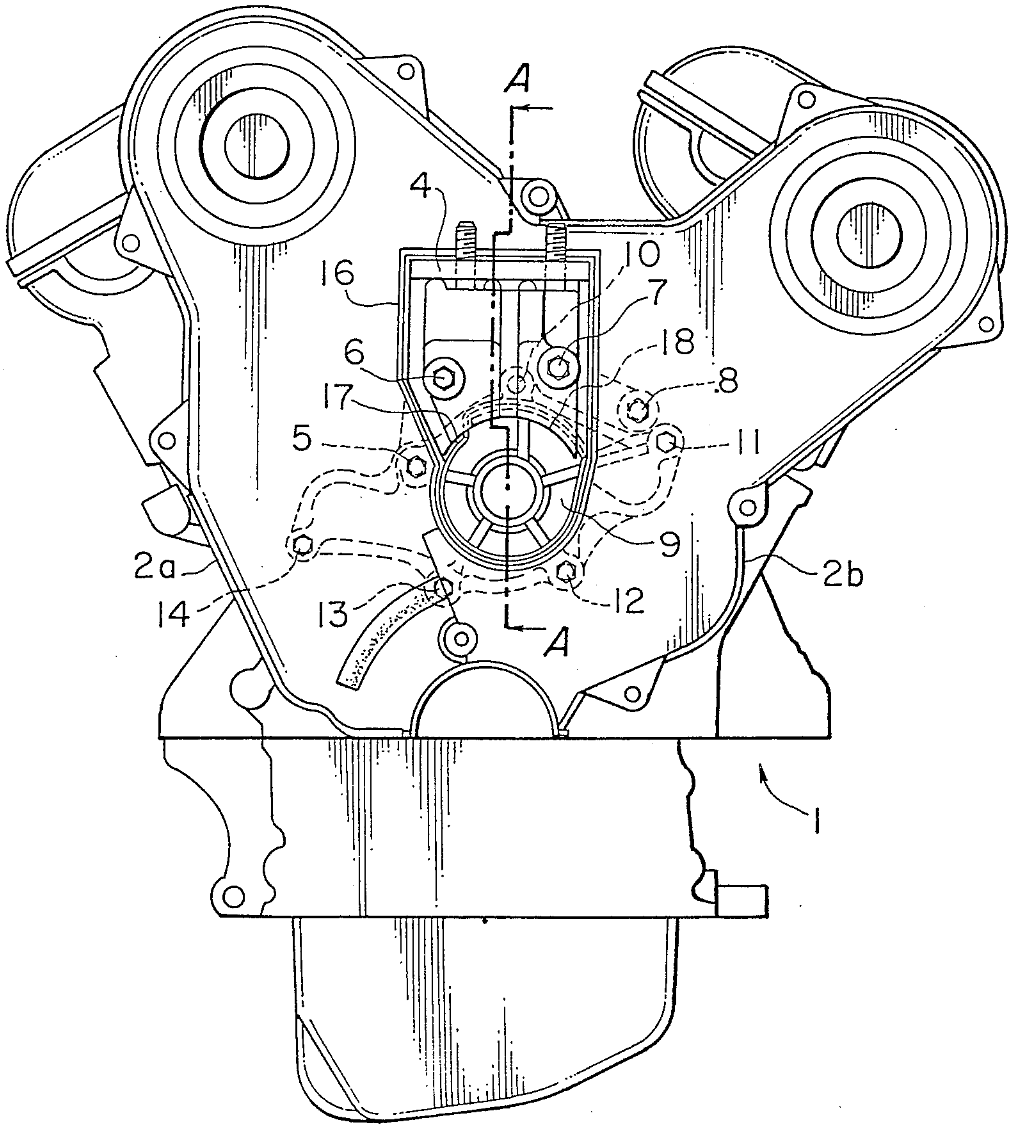
FIG. 1 is an elevational view of devices attached to an engine to which the present invention can be applied.

Referring to FIG. 1, an engine 1 is provided with a cylinder block 3 constituting a part of main body of the engine. On a front side end of the engine is mounted a cover assembly 2 divided into right belt cover 2a and left belt cover 2b for defining a timing belt chamber in which a timing belt (not shown) is disposed. A engine mount bracket 4 is mounted on the cylinder block 3 through bolt members 5, 6, 7 and 8 wherein a center line of the bracket is substantially aligned with that of the engine 1.

Below the bracket 4, a water pump housing 9 is mounted on the cylinder block 3 through bolt members 5, 10, 11, 12, 13 and 14. The bold member is commonly used for mounting both the housing 9 and the bracket 4.

Figure 2:
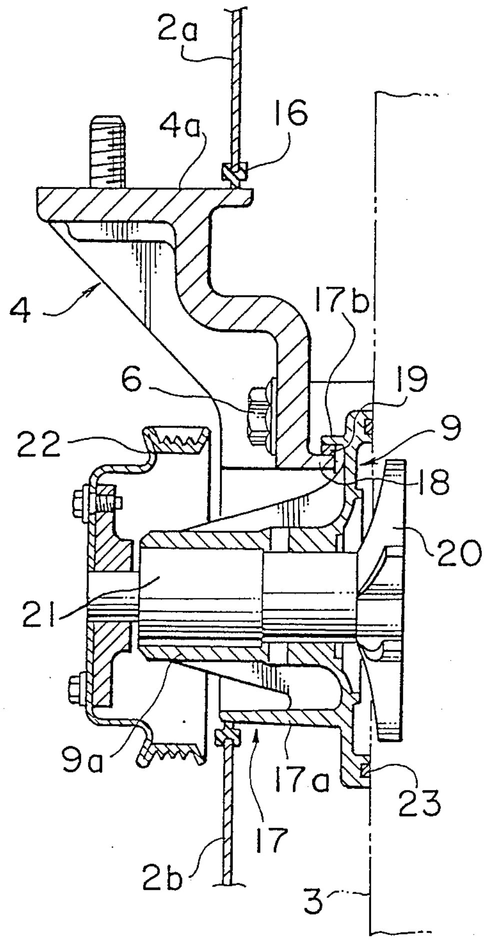
FIG. 2 is a sectional view taken along a line A—A in FIG. 1.
Figure 3:
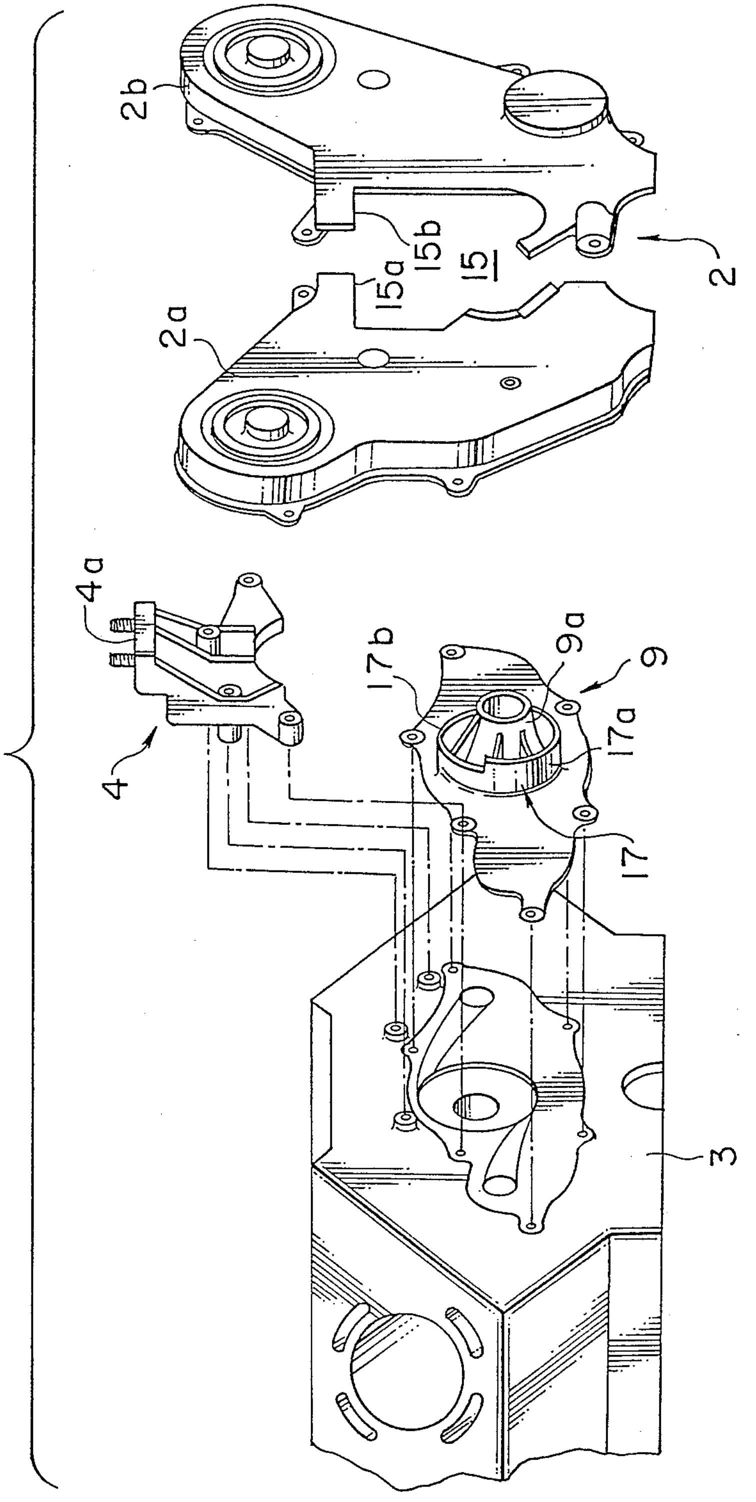
FIG. 3 is an explosive views of the devices shown in FIG. 1.

The water pump housing 9 is provided with a journal portion 9a in which a drive shaft 20 for a pump impeller 21 is inserted as shown in FIG. 2. The water pump housing 9 is positioned in a manner that a center of the journal portion is substantially aligned with the center line of the engine 1.

The belt cover 2a and 2b are formed with cut out portions 15a and 15b respectively which define an opening 15 at a joint portion of the belt covers 2a and 2b. The journal portion 9a of the pump housing 9 projects through the opening 15 of the cover assembly 2. Upper end of the opening 15 faces to an outer surface 4a of the bracket 4. A seal rubber 16 intervenes for selaing between the outer surface of the bracket 4 and an edge portion of the cut out portions 15a and 15b of the cover assembly 2 defining the upper end of the opening 15.

The water pump housing 9 is provided with an annular rib 17 around the journal portion 9a. The annular rib 17 is formed at a lower portion thereof with an extended portion 17a of semi-cylindrical configuration projecting beyond a surface of the belt covers 2a and 2b. The extended portion 17a is constituted to be continued with the outer surface 4a of the bracket 4. Upper portion of the annular rib 17 is smaller in height than the extended portion 17a formed in lower portion thereof. That is, the annular rib 17 is formed with a stepped portion of upper end of the extended portion 17a. The extended portion 17a faces to the cut out portions 15a and 15b defining a lower end of the opening 15.

The seal rubber 16 also intervenes for sealing between outer surface of the extended portion 17a and edge portion of the cut out portions 15a and 15b. The bracket 4 is provided with a circular rib 18 at a lower end thereof extending toward the cylinder block 3. The upper portion of the annular rib 17 is extended upwardly beyond the lower end of the bracket 4 in a space between inner surface of the bracket 4 and outer surface of the cylinder block 3 so that an overlapped portion is formed by the lower end portion of the bracket 4 and the upper end portion of the pump housing 9.

The upper portion of the annular rib 17 extends outwardly and the circular rib 18 of the bracket extends inwardly at a lower position of the upper portion of the annual rib 17 in parallel therewith. A seal member 19 is disposed between the upper portion of the annular rib 17 and the circular rib 18 for sealing. A pulley 22 is arranged at an outer end of the drive shaft 21. A seal member 23 is arranged at a joint portion between a mounting surface formed on the cylinder block 3 and a flange surface of the pump housing 9.

It will be understood from the above structure that the belt cover assembly 2, the engine mount bracket 4, the water pump housing 9 and the engine body member 3 are combined to associate with each other to define a substantially single closed chamber in which the timing belt is disposed.

In another embodiment, the seal member 18 and 16 can be omitted.

It will be understood that with regard to the present invention described herein, various changes and modification in amount, and composition may be resorted without departing from the scope of the claimed invention.

We claim:

1. An engine peripheral structure comprising an engine body member, belt cover means mounted on the engine body member for covering a timing belt of the engine, an engine mount bracket mounted on the engine body member through an opening formed in the belt cover means, a water pump housing arranged adjacent to the engine mount bracket and integrally formed with annular rib, the annular rib being formed with an extended portion projected beyond surface of the belt cover means through the opening of the belt cover means, the extended portion of the annular rib of the pump housing being continued with outer surface portion of the engine mount bracket, the extended portion and the outer surface portion being extended along an edge portion of the opening of the belt cover means, the engine mount bracket being formed with a circular rib facing to a remaining portion of the annualar rib other than the extended portion.

2. An engine peripheral structure as recited in claim 1 wherein the circular rib extend inwardly in parallel with the remaining portion of the annular rib to form an overlapped relationship therewith.

3. An engine peripheral structure as recited in claim 2 wherein a seal member is arranged with a space formed between the circular rib and the remaining portion of the annular rib.

4. An engine peripheral structure as recited in claim 1 wherein the belt cover means, the engine mount bracket, the water pump housing and the engine body member are combined to associate with each other to define a substantially single closed chamber in which a timing belt is disposed.

5. An engine peripheral structure as recited in claim 1 wherein the water pump housing is mounted on the engine body member below the engine mount bracket, upper portion of the water pump housing being overlapped with lower portion of the engine mount bracket.

6. An engine peripheral structure as recited in claim 1 wherein the water pump housing and the engine mount bracket are mounted on the engine body member through plural bolt members at least one of which is commonly used for the water pump housing and the bracket.

7. An engine peripheral structure as recited in claim 1 wherein an outer surfaces of the water pump housing forms a substantially continuous outer surface inassociation with an outer surface of the engine mount bracket, said substantially continuous outer surface being complementary with the opening defined by the cover means.

8. An engine peripheral structure as recited in claim 7 wherein a seal member is disposed in a space formed between said substantially continuous outer surface and edge portion of the cover means defining the opening.

9. An engine peripheral structure as recited in claim 7 wherein the extended portion forms a lower part of the substantially continuous outer surface.

10. An engine peripheral structure as recited in claim 7 wherein outer surface of the engine mount bracket forms an upper part of the substantially continuous outer surface.

11. An engine peripheral structure as recited in claim 1 wherein the annular rib is provided around a journal portion for carrying a drive shaft of a water pump.

12. An engine peripheral structure as recited in claim 11 wherein the drive shaft extend through the opening of the belt cover means.

13. An engine peripheral structure as recited in claim 12 wherein a center of the drive shaft is substantially aligned with a center line of a side of the engine on which a crank shaft is positioned.

14. An engine peripheral structure as recited in claim 1 wherein the annular rib is formed with a stepped portion of upper end of the extended portion.

15. An engine peripheral structure as recited in claim 1 wherein the belt cover means is constituted by a pair of cover members joined substantially along a center line of the engine on which a crank shaft is positioned.

16. An engine peripheral structure as recited in claim 1 wherein the engine body member is a cylinder block.

17. An engine peripheral structure as recited in claim 1 wherein the extended portion have a substantially semi-cylindrical configuration.

* * * * *